United States Patent
Kief et al.

(10) Patent No.: US 9,406,321 B2
(45) Date of Patent: Aug. 2, 2016

(54) READ HEAD WITH MULTIPLE READER STACKS

(71) Applicant: Seagate Technology LLC, Cupertino, CA (US)

(72) Inventors: Mark Thomas Kief, Lakeville, MN (US); Thomas Roy Boonstra, Chaska, MN (US); Victor Boris Sapozhnikov, Minnetonka, MN (US); Harry Sam Edelman, Minneapolis, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 5 days.

(21) Appl. No.: 14/192,467

(22) Filed: Feb. 27, 2014

(65) Prior Publication Data
US 2015/0243302 A1 Aug. 27, 2015

(51) Int. Cl.
*G11B 5/39* (2006.01)

(52) U.S. Cl.
CPC ............ *G11B 5/3912* (2013.01); *G11B 5/3948* (2013.01); *G11B 5/3964* (2013.01); *G11B 5/3909* (2013.01); *G11B 2005/3996* (2013.01)

(58) Field of Classification Search
CPC ............ G11B 5/10; G11B 5/11; G11B 5/265; G11B 5/33; G11B 5/39; G11B 5/3912; G11B 5/3929; G11B 5/3945; G11B 5/3948; G11B 5/3951; G11B 5/3954; G11B 5/3958; G11B 5/3964
USPC ........................ 360/314, 316, 319, 322, 324.1
See application file for complete search history.

(56) References Cited

U.S. PATENT DOCUMENTS

| | | | | |
|---|---|---|---|---|
| 6,819,530 B2 * | 11/2004 | Gill | ............................. | 360/314 |
| 7,408,730 B2 * | 8/2008 | Yamagishi | ..................... | 360/46 |
| 7,436,632 B2 * | 10/2008 | Li et al. | ......................... | 360/315 |
| 8,243,398 B2 * | 8/2012 | Partee et al. | .................. | 360/314 |
| 8,786,987 B2 | 7/2014 | Edelman et al. | | |
| 8,824,106 B1 | 9/2014 | Garfunkel et al. | | |
| 8,873,204 B1 | 10/2014 | Gao et al. | | |
| 8,891,207 B1 * | 11/2014 | Li et al. | ......................... | 360/316 |
| 8,908,333 B1 * | 12/2014 | Rudy et al. | .................... | 360/319 |
| 8,970,988 B1 * | 3/2015 | Li et al. | ...................... | 360/235.4 |
| 9,042,058 B1 | 5/2015 | Li et al. | | |
| 9,042,059 B1 * | 5/2015 | Katine | ................. | G11B 5/3909 360/316 |
| 9,087,527 B1 | 7/2015 | Li et al. | | |
| 9,099,125 B1 | 8/2015 | Hattori et al. | | |
| 9,123,361 B1 * | 9/2015 | Kief | ...................... | G11B 5/265 |
| 9,190,082 B2 * | 11/2015 | Sapozhnikov | ....... | G11B 5/3951 |
| 9,269,383 B1 * | 2/2016 | Hattori | ................. | G11B 5/3932 |

(Continued)

OTHER PUBLICATIONS

Van Dijken et al., "IrMn as exchange-biasing material in systems with perpendicular magnetic anisotropy", Journal of Applied Physics, vol. 97, 2005, pp. 10K114-1-10K114-3.

(Continued)

*Primary Examiner* — Jefferson Evans
(74) *Attorney, Agent, or Firm* — Hollingsworth Davis, LLC (57) ABSTRACT

A read head includes a bottom shield configured as a bottom electrical contact. A bottom reader stack is disposed on and electrically coupled to the bottom shield. A middle electrical contact is electrically coupled to a top layer of the bottom reader stack. A top reader stack is disposed on the bottom reader stack. A bottom layer of the top reader stack electrically coupled to the middle electrical contact. A top shield is configured as a top electrical contact. The top shield is disposed on and electrically coupled to the top reader stack.

20 Claims, 10 Drawing Sheets

(56) References Cited

U.S. PATENT DOCUMENTS

| | | | |
|---|---|---|---|
| 2003/0151855 A1 | 8/2003 | Molstad et al. | |
| 2011/0069413 A1 | 3/2011 | Maat et al. | |
| 2011/0134572 A1 | 6/2011 | Qiu et al. | |
| 2012/0307404 A1* | 12/2012 | Braganca et al. | 360/245.8 |
| 2013/0265039 A1* | 10/2013 | Cai | G01R 33/098 324/252 |
| 2013/0286502 A1 | 10/2013 | Erden et al. | |
| 2013/0286511 A1 | 10/2013 | Edelman et al. | |
| 2014/0119106 A1* | 5/2014 | Lee | H01L 27/228 365/158 |
| 2015/0062735 A1 | 3/2015 | Sapozhnikov et al. | |
| 2015/0170678 A1 | 6/2015 | Mastain | |
| 2015/0255092 A1 | 9/2015 | Macken et al. | |
| 2015/0269956 A1 | 9/2015 | Isowaki et al. | |
| 2016/0005424 A1 | 1/2016 | McKinlay et al. | |
| 2016/0005425 A1* | 1/2016 | McKinlay | G11B 5/265 360/121 |

OTHER PUBLICATIONS

File History for U.S. Appl. No. 14/323,119.
File History for U.S. Appl. No. 14/323,027.

* cited by examiner

READ HEAD WITH MULTIPLE READER STACKS

SUMMARY

In one embodiment of a read head includes a bottom shield configured as a bottom electrical contact. A bottom reader stack is disposed on and electrically coupled to the bottom shield. A middle electrical contact is electrically coupled to a top layer of the bottom reader stack. A top reader stack is disposed on the bottom reader stack. A bottom layer of the top reader stack electrically coupled to the middle electrical contact. A top shield is configured as a top electrical contact. The top shield is disposed on and electrically coupled to the top reader stack.

In another embodiment, a read head includes a bottom shield configured as a bottom electrical contact. A bottom reader stack is disposed on and electrically coupled to the bottom shield. At least one middle shield is disposed on the bottom reader stack and configured as at least one middle electrical contact. A top reader stack is disposed on the at least one middle shield. A top shield is configured as a top electrical contact. The top shield is disposed on and electrically coupled to the top reader stack. At least one of the top and bottom reader stacks are electrically coupled to the at least one middle shield.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Data storage systems may include one or more magnetic heads having a transducer configured to write and read information to and from a magnetic storage medium. The quantity of data that can be stored (e.g., written) within an area of the magnetic storage medium is generally known as the "areal density." For some applications such as two-dimensional magnetic recording (TDMR), some magnetic heads include multiple read heads configured for reading data from one or more tracks of the magnetic storage medium. In certain embodiments, multiple (e.g., two or more) nearly independent readers are defined and integrated in a "stacked" reader configuration. The amount of data that can be read and processed by a stacked reader head increases proportionally to the number of readers included in the stack.

Some single-track, multi-reader configurations include a stacked reader wherein single readers are successively stacked atop each other. For instance, a two reader stacks can be configured to read twice the amount of data read by a single reader. In some cases, the cross-track alignment between the stacked readers needs to be finely controlled to a fraction of the track pitch.

A stacked reader configuration may experience increased skew sensitivity as determined by the down-track spacing between the individual readers. However, proper alignment of the individual readers can reduce the skew sensitivity and improve the cross-track performance. In some stacked reader configurations, alignment error between individual readers may be reduced by self-aligning the readers using a successive masking process. The skew sensitivity of the stacked reader may also be reduced by decreasing the down-track spacing between the readers.

Figure 1A:
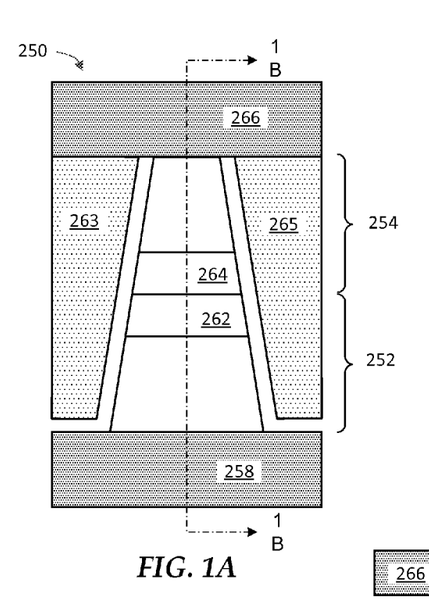
FIG. 1A is a plan view of a media-reading surface in an embodiment of a read head.
Figure 1B:
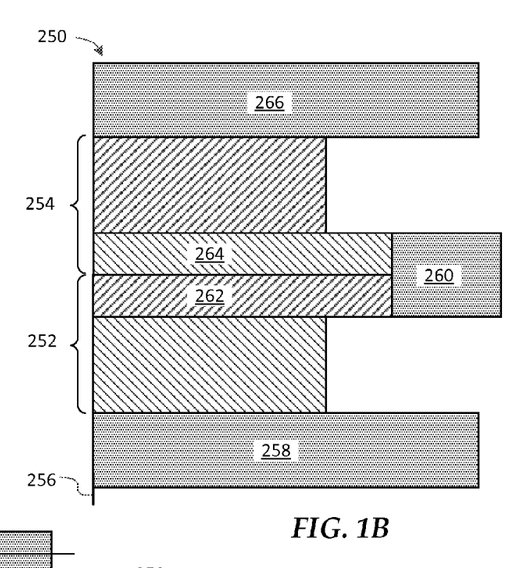
FIG. 1B is a cross-sectional view along line 1B-1B of the read head of FIG. 1A.
Figure 1C:
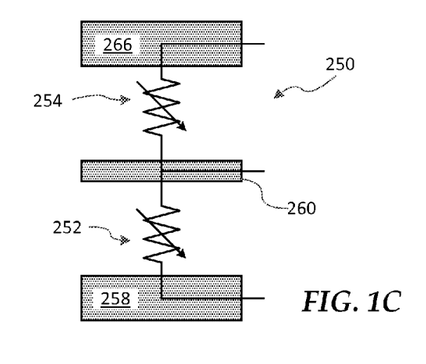
FIG. 1C is an electrical circuit representation of the read head of FIG. 1A.

FIGS. 1A-1C illustrate an embodiment of a read head 250 having vertically stacked bottom reader stack 252 and top reader stack 254. FIG. 1A is a plan view of a media-reading surface 256, e.g., air bearing surface (ABS) of the read head 250. For purposes of this discussion, "vertical" refers to the reader stacks 252, 254 being located downtrack of each other, the downtrack direction being indicated by centerline 1B-1B. The reader stacks 252, 254 may be configured as tunneling magneto-resistance (TMR) and/or giant magneto-resistance (GMR) sensors.

As seen in the view of FIG. 1A, the top reader stack 254 is disposed on the bottom reader stack 252, and the bottom reader stack 252 is wider in a cross track direction than top reader stack 254. The reader stacks 252, 254 are surrounded by side shields 263, 265 on either side, and by top and bottom shields 258, 266 in the vertical direction. These shields 258, 263, 265, 266 magnetically shield the reader stacks 252, 254. In some alternative configurations, the side shields 263, 265 may be configured as permanent magnets.

FIG. 1B is a cross-sectional view along section line 1B-1B of the read head 250 shown in FIG. 1A. FIG. 1C is an electrical circuit representation of the read head 250. The bottom reader stack 252 is disposed on and electrically coupled to the bottom shield 258, which is configured as a bottom electrical contact. A middle (e.g., center) electrical contact 260 is electrically coupled to a top layer 262 of the bottom reader stack 252 and a bottom layer 264 of the top reader stack 254. The top shield 266, configured as a top electrical contact, is disposed on and electrically coupled to the top reader stack 254. By electrically coupling the reader stacks 252, 254 in this way, the number of electrical leads for the read head 250 can be minimized.

The reader stacks 252, 254 may be configured as TMR sensors and/or GMR sensors. Generally, these sensors exhibit a varying resistance responsive to changing magnetic fields. The reader stacks 252, 254 may be formed from a similar arrangement of layers, e.g., seed layer, antiferromagnet layer, synthetic antiferromagnet layer, spacer/barrier layer, free layer, and cap layer. In some embodiments, the order of at least some of these layers may be different (e.g., reversed) for one of the reader stacks 252, 254.

Because the reader stacks 252, 254 are closely adjacent one another and have no intervening layers therebetween, skew sensitivity between the reader stacks 252, 254 can be reduced. Additionally, the process of forming reader stacks 252, 254 in this way facilitates precisely aligning the reader stacks 252, 254 to each other. For example, because the reader stacks are formed on top of each other, alignment error between successive masking steps can be minimized when forming the stack layers. In some embodiments shown below, a shield and other layers may be located between top and bottom reader stacks. While the use of a middle shield will somewhat increase the downtrack separation of the top and bottom reader stacks, the middle shield may help improve some performance aspects, such as reducing electrical and/or magnetic interference between the reader stacks.

Figure 2A:
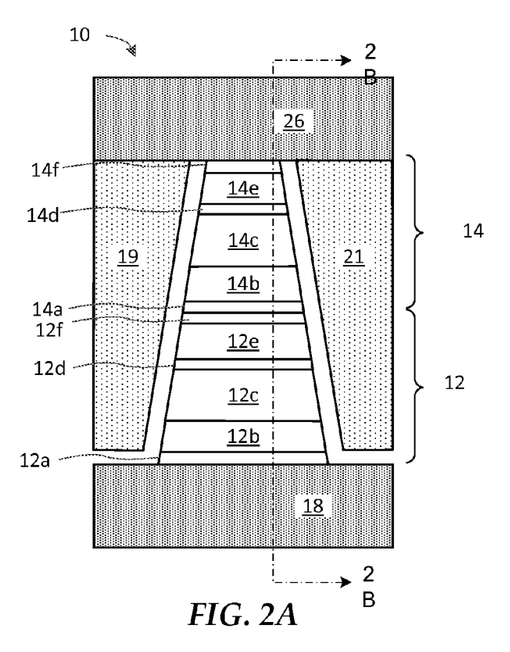
FIG. 2A is a plan view of a media-reading surface in an embodiment of a read head.
Figure 2B:
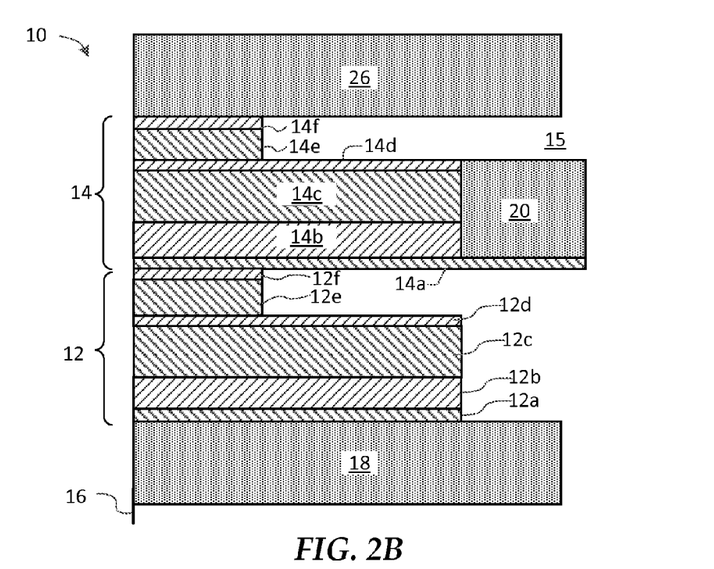
FIG. 2B is a cross-sectional view along a centerline 2B-2B of the read head of FIG. 2A.
Figure 2C:
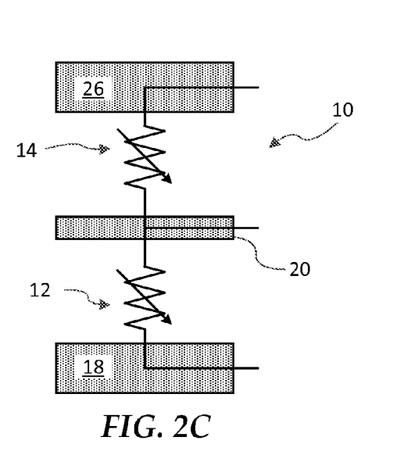
FIG. 2C is an electrical circuit representation of the read head of FIG. 2A.

FIGS. 2A-2C illustrate an embodiment of a read head 10 having vertically stacked bottom reader stack 12 and top reader stack 14. FIG. 2A is a plan view of a media-reading surface 16 of the read head 10. FIG. 2B is a cross-sectional view along section line 2B-2B of the read head 10 shown in FIG. 2A. FIG. 2C is an electrical circuit representation of the read head 10. The bottom reader stack 12 is disposed on and electrically coupled to a bottom shield 18 configured as a bottom electrical contact. A middle (e.g., center) electrical contact 20 is electrically coupled to a top layer 12$f$ of the bottom reader stack 12. The top reader stack 14 is disposed on the bottom reader stack 12, and a bottom layer 14$a$ of the top reader stack 14 is electrically coupled to the middle electrical contact 20. A top shield 26, configured as a top electrical contact, is disposed on and electrically coupled to the top reader stack 14. Side shields (or permanent magnets) 19, 21 encompass cross-track-facing edges of the reader stacks 12, 14.

In the embodiment of the read head 10 illustrated in FIGS. 2A-2C, the middle electrical contact 20 is configured as a common electrical contact shared by the bottom and top reader stacks 12 and 14. The bottom and middle electrical contacts 18 and 20 are used for the bottom reader stack 12, and the top and middle electrical contacts 26 and 20 are used for the top reader stack 14. Accordingly, the read head 10 includes three electrical contacts and two reader stacks. As such, the read head 10 is referred to as having a "three-contact two-reader" structure or configuration.

In this embodiment, the bottom and top reader stacks 12 and 14 are both configured as BSV readers. The bottom reader stack 12 includes a bottom seed layer 12$a$, followed by a bottom anti-ferromagnetic (AF) layer 12$b$, a bottom synthetic anti-ferromagnetic (SAF) layer 12$c$, a bottom spacer/barrier 12$d$, a bottom free layer 12$e$, and a bottom cap layer 12$f$. The top reader stack 14 includes a top seed layer 14$a$ facing (e.g., in contact with) the bottom cap layer 12$f$ of the bottom reader stack 12. The top reader stack further includes a top AF layer 14$b$, a top SAF layer 14$c$, a top spacer/barrier 14$d$, a top free layer 14$e$, and a top cap layer 14$f$. The bottom seed layer 12$a$ of the bottom reader stack 12 is disposed on and electrically coupled to the bottom shield 18. The top shield 26 is disposed on and electrically coupled to the top cap layer 14$f$ of the top reader stack 14.

In this embodiment, the bottom and top reader stacks 12 and 14 include relatively long SAF layers 12$c$, 14$c$ extending from the media-reading surface 16. The long SAF layers 12$c$, 14$c$ may improve the stability of the AF/SAF layers of the read head 10. As best seen in FIG. 2B at least a portion of the middle electrical contact 20 can be disposed on and electrically coupled to at least a portion of an extended seed layer 14$a$. A region of the read head 10 facing away from the media-facing surface 16, generally indicated by reference number 15, is filled with an isolation material.

Some embodiments of stacked readers may include one or more long SAF layers and/or one or more standard SAF layer. In certain embodiments, a long SAF layer may be provided between the two successive reader stacks and configured as a common middle or center contact shared by the two readers. Since the readers also include individual contacts, such configurations of two stacked readers may be referred to as a "three-contact two-reader" structure.

As noted above, the bottom and top reader stacks 12 and 14 are each configured as BSV readers. As such, the three-contact two-reader structure of the read head 10 includes two BSV readers, one stacked over the other. As described elsewhere, a reader stack may also be configured as a top spin valve (TSV) reader. Accordingly, some embodiments of a three-contact two-reader structure read head may include a top reader stack configured as a TSV reader disposed over a bottom reader stack configured as a BSV reader. Also as described elsewhere, embodiments of read heads include configurations having a "four-contact two-reader" structure, and configurations having more than two successively disposed reader stacks.

Figure 3:
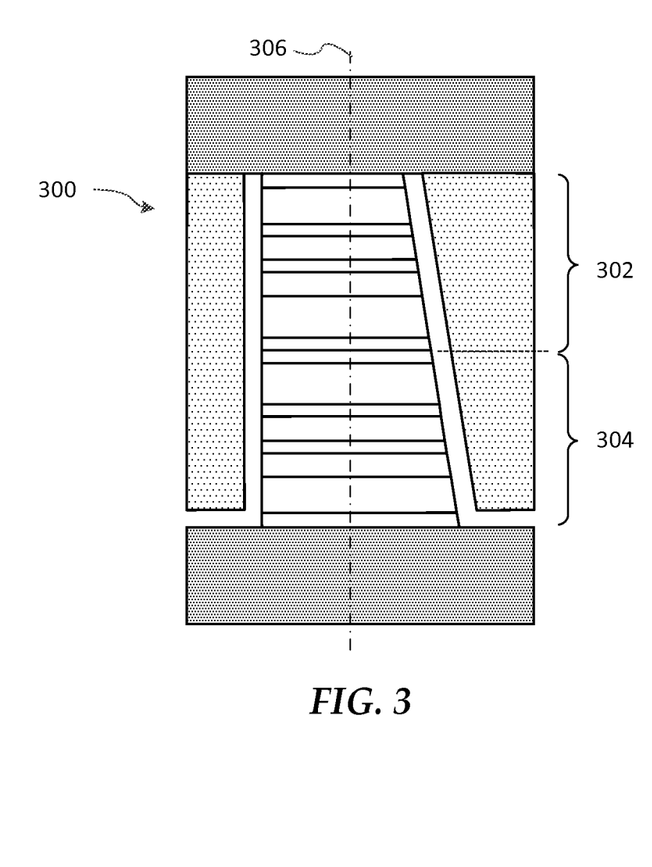
FIG. 3 is a plan view of a media-reading surface in another embodiment of a read head.

With reference to FIG. 2A, it is seen that the bottom and top reader stacks 12 and 14, respectively, of the read head 10 are symmetrically stacked about the centerline 2B-2B. However, such symmetrical structures are not a requirement and therefore should not be construed as a limitation in the various embodiments of the read heads described herein. For instance, the FIG. 3 is a view from the media-facing surface of a read head according to an embodiment. The read head 300 includes top and bottom reader stacks 302 and 304, respectively, that are formed are asymmetrically about a downtrack centerline 306 of the read head 300. The reader stacks 302, 304 may be any combination of BSV and TSV readers.

Figure 4:
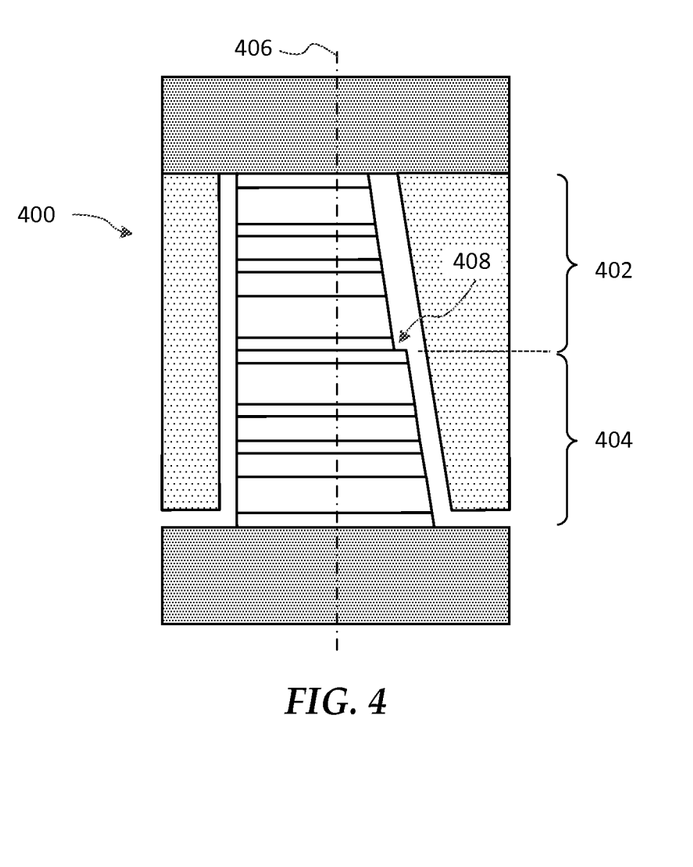
FIG. 4 is a plan view of a media-reading surface in yet another embodiment of a read head.

FIG. 4 illustrates a media-reading surface of another embodiment of a read head 400 wherein top and bottom reader stacks 402 and 404, respectively, are asymmetric about a downtrack centerline 406 of the read head 400. At least a portion of the bottom and top reader stacks 402 and 404 are offset 408 relative to one another. In the illustrated embodiment of the read head 400, the layers of the bottom reader stack 404 may be relatively wider than the layers of the top reader stack 402. For each of the asymmetrical embodiments of the read heads 300 and 400 illustrated in FIGS. 3 and 4, the cross-sectional view along their respective centerlines may be substantially similar to the cross-sectional view along the centerline 2B-2B of the read head 10 illustrated in FIG. 2B. Likewise, embodiments of electrical circuit representations of the read heads 300 and 400 may be also substantially similar to that illustrated in FIG. 2C for the read head 10.

Figures 5A, 5B, 5C:
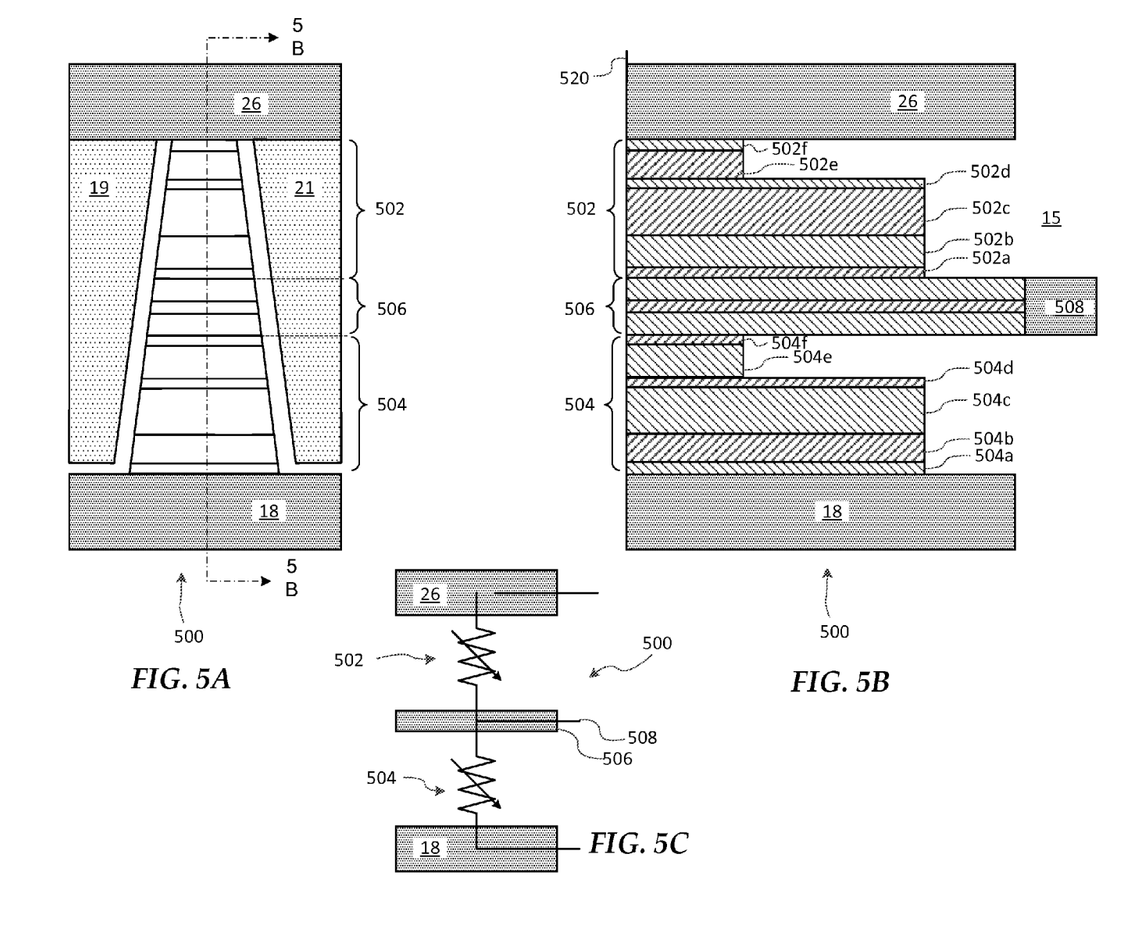
FIG. 5A is a plan view of a media-reading surface in an embodiment of a read head.
FIG. 5B is a cross-sectional view along a centerline 5B-5B of the read head of FIG. 5A.
FIG. 5C is an electrical circuit representation of the read head of FIG. 5A.

In the following, components, structures, etc., having similar functions as those described with reference to FIGS. 2A-2C are referenced by like numerals and are not further described except as necessary. FIGS. 5A-5C illustrate an alternate embodiment of a "three-contact two-reader" read head 500 having vertically stacked bottom and top reader stacks 504 and 502, respectively, with a middle shield 506 in between. FIG. 5A is a plan view of a media-reading surface 520 of the read head 500. The top and bottom stacks 502, 504 are contiguous with one another and symmetric about the illustrated downtrack section line 5B-5B, although may be asymmetric and/or discontiguous as shown in FIGS. 3 and 4.

FIG. 5B is a cross-sectional view along section line 5B-5B of the read head 500 shown in FIG. 5A. The top and bottom reader stacks 502, 504 are shown as BSV readers, although one or both may be configured as a TSV reader. The bottom reader stack 504 includes a seed layer 504a at the bottom, followed by an AF layer 504b, an SAF layer 504c, a spacer/barrier 504d, a free layer 504e, and a cap layer 504f. The cap layer 504f is adjacent a middle shield 506. The top reader stack 502 includes a seed layer 502a facing (e.g., in contact with) a middle shield 506. The top reader stack 502 further includes an AF layer 502b, an SAF layer 502c, a spacer/barrier 502d, a free layer 502e, and a cap layer 502f. At least a portion of the middle shield 506 is coupled to a middle or center electrical contact 508.

In certain embodiments, the middle electrical contact 508 is disposed on and electrically coupled to the middle shield 504. The middle shield 506 may include an SAF layer. The bottom and top reader stacks 504 and 502 are electrically coupled to the at least one middle shield 506 and, by extension, to the at least one middle electrical contact 508. Accordingly, the at least one middle electrical contact 508 is common to and shared by the bottom and top reader stacks 504, 502. As illustrated in FIG. 5C, an embodiment of an electrical circuit representation of the three-contact two-reader read head 500 is similar to that illustrated in FIG. 2C for the read head 10.

Figures 6A, 6B, 6C:
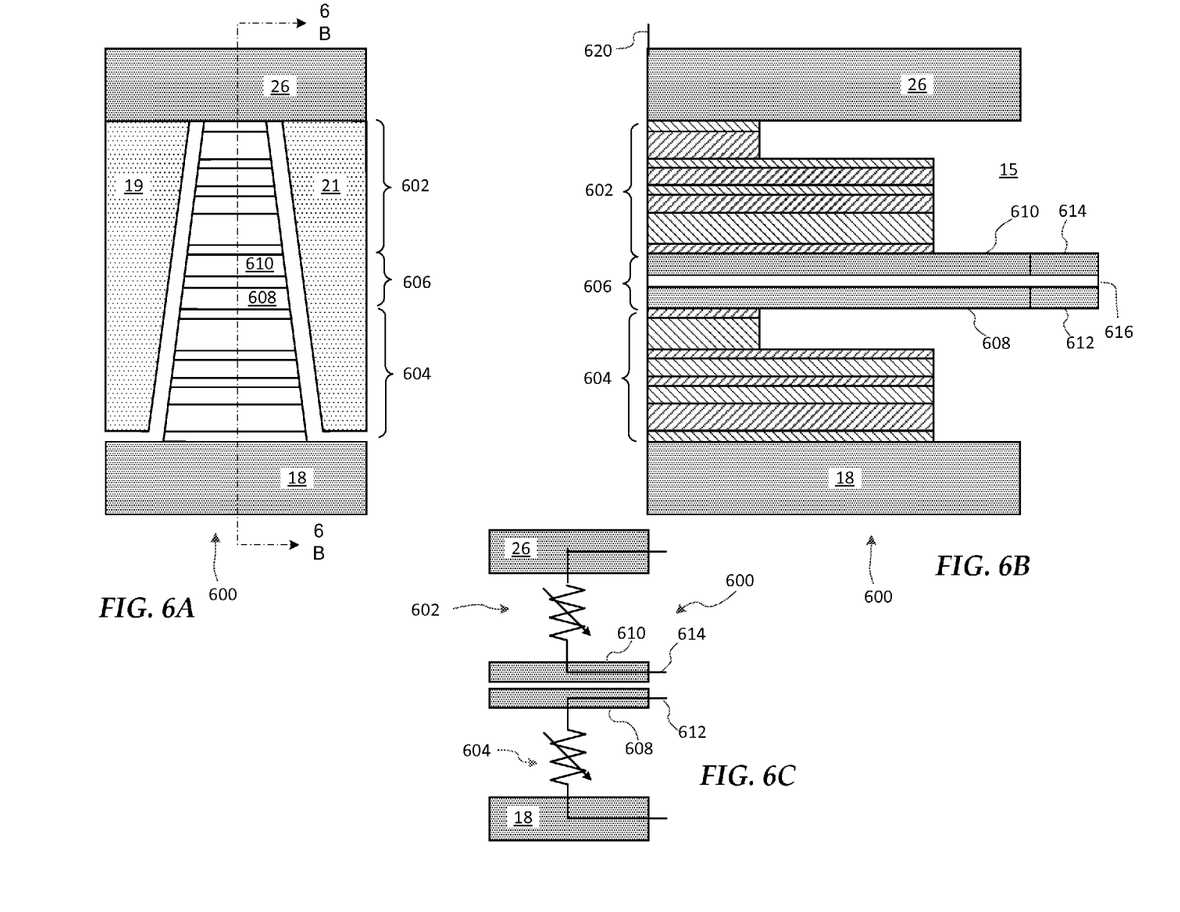
FIG. 6A is a plan view of a media-reading surface in another embodiment of a read head.
FIG. 6B is a cross-sectional view along a centerline 6B-6B of the read head of FIG. 6A.
FIG. 6C is an electrical circuit representation of the read head of FIG. 6A.

FIGS. 6A-6C illustrate an embodiment of a "four-contact two-reader" read head 60 having vertically stacked bottom and top reader stacks 604 and 602, respectively. FIG. 6A is a plan view of a media-reading surface 620 of the read head 600. The top and bottom stacks 502, 504 are contiguous with one another and symmetric about the illustrated downtrack section line 5B-5B, although may be asymmetric and/or discontiguous as shown in FIGS. 3 and 4. The top and bottom stacks 502, 504 may be configured as any combination of BSV and TSV readers.

FIG. 6B is a cross-sectional view along centerline 6B-6B of the read head 60 shown in FIG. 6A. In contrast to the read head 500 shown in FIGS. 5A-5C, the illustrated embodiment of the read head 600 includes at least one middle shield 606 having a lower middle shield 608 and an upper middle shield 610 disposed between the bottom and top reader stacks 604, 602. The lower middle shield 608 is disposed on and electrically coupled to the bottom reader stack 604, and the top reader stack 602 is disposed on and electrically coupled to the upper middle shield 610. Portions of each of the lower and upper middle shields 608, 610 are respectively coupled to lower and upper middle electrical contacts 612, 614. An electrical isolation layer 616 extends between the lower and upper middle shields 608, 610 and between the lower and upper middle electrical contacts 612, 614.

As illustrated in FIG. 6C, the read head 600 does not have a common electrical contact which is shared by the bottom and top reader stacks 612 and 614. The shields 18 and 608 serve as electrical contacts for the bottom reader stack 604, and the shields 26 and 614 serve as electrical contacts for the top reader stack 602. Accordingly, the read head 600 includes at least four electrical contacts and two reader stack and s referred to as having a "four-contact two-reader" structure or configuration.

Figures 7A, 7B, 7C:
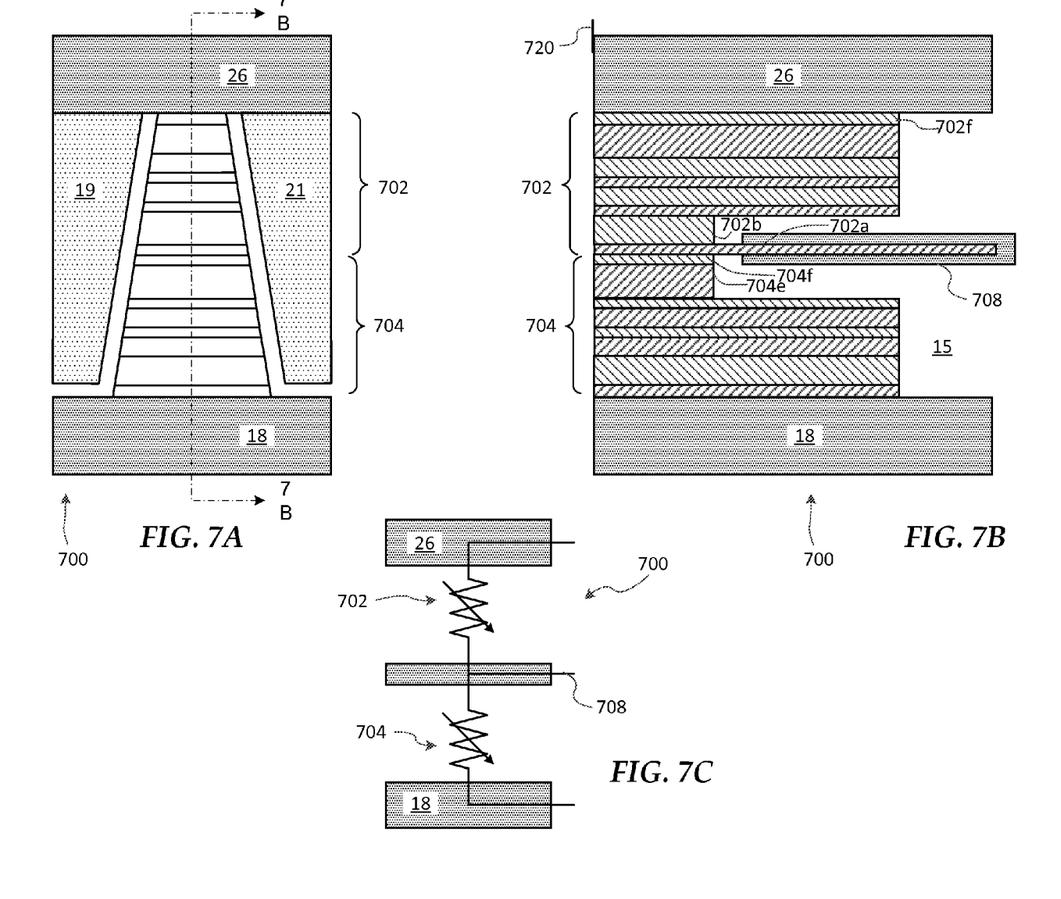
FIG. 7A is a plan view of a media-reading surface in yet another embodiment of a read head.
FIG. 7B is a cross-sectional view along a centerline 7B-7B of the read head of FIG. 7A.
FIG. 7C is an electrical circuit representation of the read head of FIG. 7A.

FIGS. 7A-7C illustrate an embodiment of a "three-contact two-reader" read head 100 having vertically stacked bottom reader stack 704 and top reader stack 702. FIG. 7A is a plan view of a media-reading surface 720 of the read head 700. FIG. 7B is a cross-sectional view along section line 7B-7B of the read head 700 shown in FIG. 7A. FIG. 7C is an electrical circuit representation of the read head 700. The bottom reader stack 704 is disposed on and electrically coupled to a bottom shield 18 configured as a bottom electrical contact. A middle (e.g., center) electrical contact 708 is electrically coupled to a top layer 704f of the bottom reader stack 704 and a bottom layer 702a of the top reader stack 702. The top shield 26, configured as a top electrical contact, is disposed on and electrically coupled to the top reader stack 702.

In the read head 700 illustrated in FIGS. 7A-7C, the middle electrical contact 106 is configured as a common electrical contact shared by the bottom and top reader stacks 704 and 702, respectively. As seen in FIG. 7C, the bottom shield 18 and middle electrical contact 708 are used for the bottom reader stack 704. The top shield 26 and middle electrical contact 708 are used for the top reader stack 702. In reference again to FIG. 7B, layer 702b of the top reader stack 702 and layer 704e of the bottom reader stack 704 are both free layers. As such, the top reader stack 702 is configured as TSV reader (e.g., TMR or GMR) and the bottom reader stack 704 is configured as a BSV reader (e.g., TMR or GMR).

In some embodiments, a selected one of the bottom and top reader stacks may include a relatively longer AF layer that extends further away from the media-reading surface of the read head than a relatively shorter AF layer of the other of the bottom and top reader stacks. This length of the layers extending away from the media-facing surface is also known as "stripe height."

Figure 8:
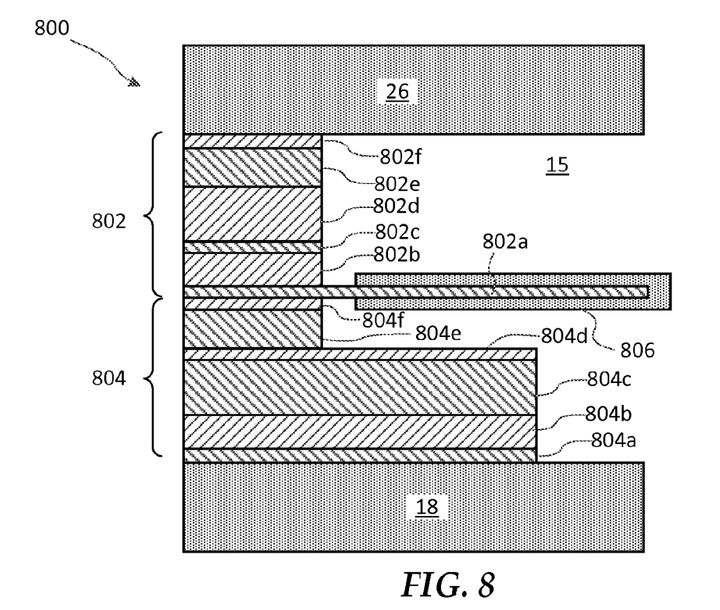
FIG. 8 is a cross-sectional view along a centerline of an embodiment of a read head.

FIG. 8 is a cross-sectional view along a centerline of a read head 800. A bottom reader stack 804 of the read head includes a relatively longer seed layer 804a, AF layer 804b, and SAF layer 804c compared to shorter cap layer 802f, SAF layer 802e, and AF layer 802d of a top reader stack 802. The shorter layers 802d-f of the top stack may be easier to manufacture. The top reader stack 802 is configured as a TSV reader (e.g., TMR or GMR) and further includes a spacer/barrier 802c, freelayer 802b, and seed layer 802a. The bottom reader stack 804 is configured as a BSV reader (e.g., TMR or GMR) and further includes a spacer/barrier 804d, free layer 804e, and cap layer 804f.

Figure 9:
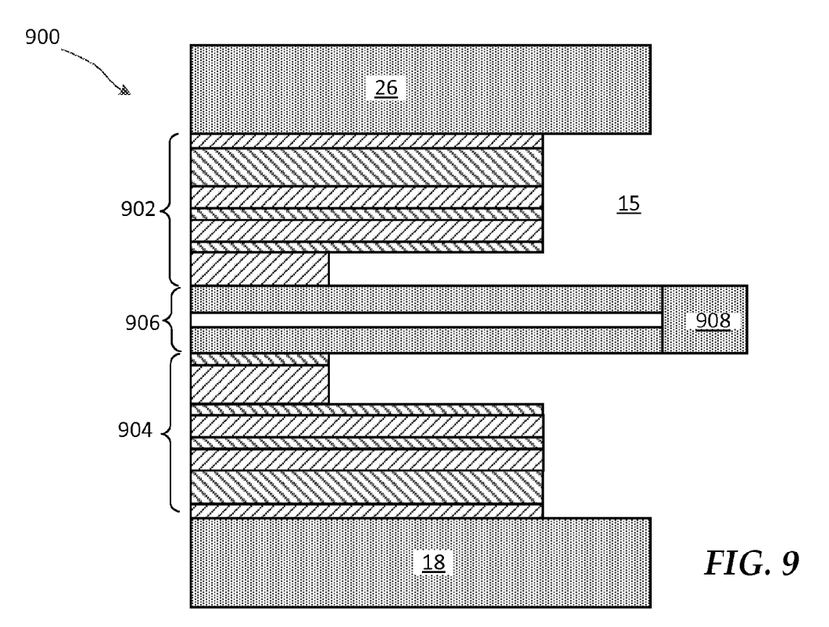
FIG. 9 is a cross-sectional view along a centerline of another embodiment of a read head.

FIG. 9 is a cross-sectional view along a centerline of a "three-contact two-reader" read head 900 having at least one middle shield 906 disposed between a top reader stack 902 and a bottom reader stack 904. The top reader stack 902 is configured as a TSV reader (e.g., TMR or GMR) and the bottom reader stack 904 is configured as a BSV reader (e.g., TMR or GMR). Reference can be made to the description of FIG. 8 for examples of layers included in TSV and BSV stacks. The middle shield 906 is coupled to a middle or center electrical contact 908. It should be apparent that an embodiment of an electrical circuit representation for the read head 900 will be similar to that illustrated in FIG. 7C for the read head 700.

Figure 10:
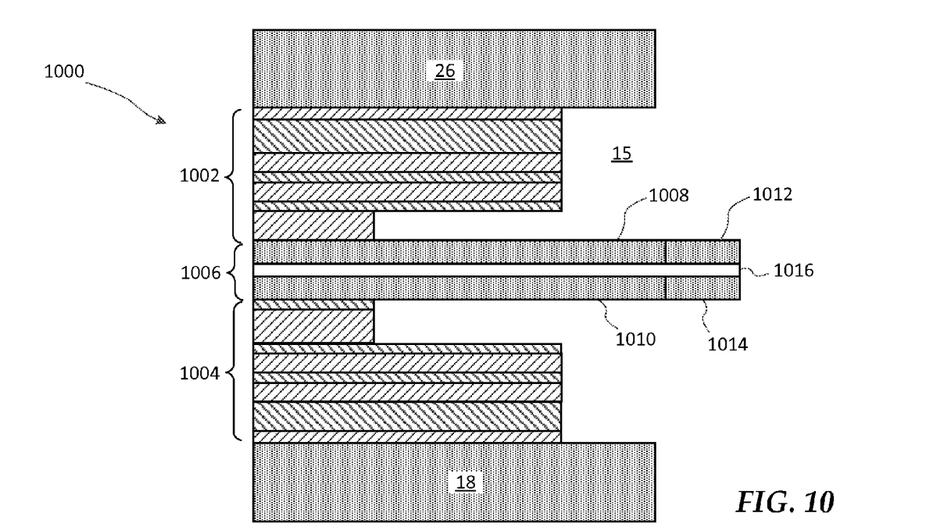
FIG. 10 is a cross-sectional view along a centerline of yet another embodiment of a read head.

FIG. 10 illustrates an embodiment of a "four-contact two-reader" read head 140 having vertically stacked bottom and top reader stacks 1004 and 1002, respectively. The top reader stack 1002 is configured as a TSV reader (e.g., TMR or GMR) and the bottom reader stack 1004 is configured as a BSV reader (e.g., TMR or GMR). Reference can be made to the description of FIG. 8 for examples of layers included in TSV and BSV stacks. The middle shield 1006 is split, having a lower middle shield 1010 and an upper middle shield 1008 that are coupled to lower and upper middle electrical contacts 1014 and 1012. An electrical isolation layer 1016 is between a lower middle shield 1010 and the upper middle shield 1008, extending between the lower and upper middle shields 1010 and 1008 and between the lower and upper middle electrical contacts 1014 and 1012. An embodiment of an electrical circuit representation of the read head 1000 will be similar to that illustrated in FIG. 6C for the read head 600.

Figure 11A:
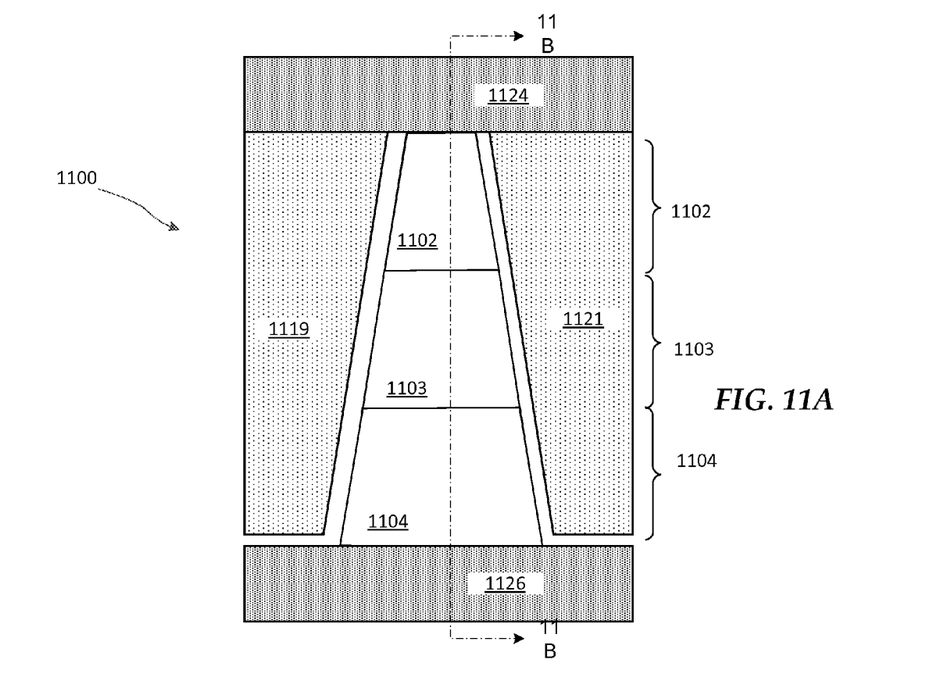
FIG. 11A is a plan view of a media-reading surface in an embodiment of a read head.
Figure 11B:
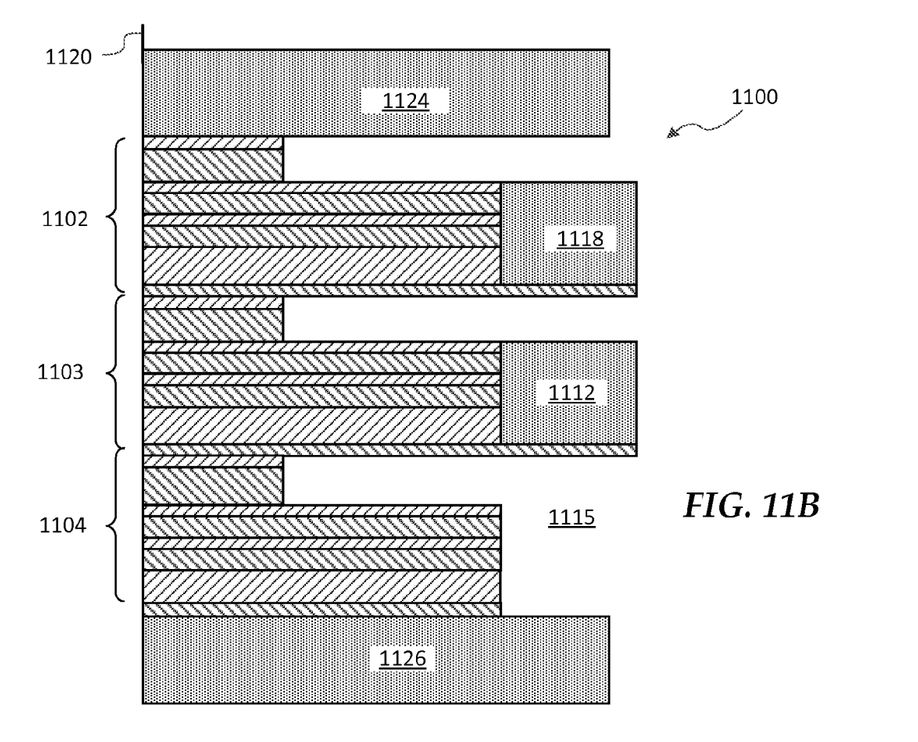
FIG. 11B is a cross-sectional view along a centerline 11B-11B of the read head of FIG. 11A.
Figure 11C:
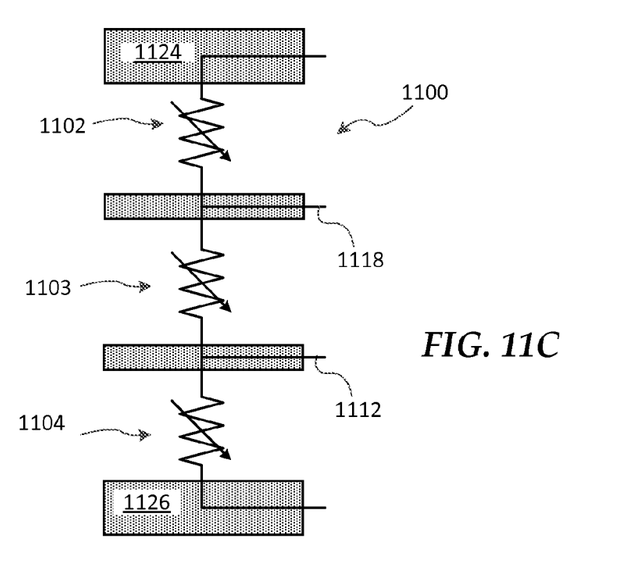
FIG. 11C is an electrical circuit representation of the read head of FIG. 11A.

FIGS. 11A-11C illustrate an embodiment of a read head 200 having vertically stacked bottom reader stack 1104, middle reader stack 1103 and top reader stack 1102. FIG. 11A is a plan view of a media-reading surface 1120 of the read head 1100. In this view, top shield 1124, bottom shield 1126 and side shields 1119 and 1121 can be seen. FIG. 11B is a cross-sectional view along centerline 11B-11B of the read head 1100 shown in FIG. 11A. A first middle electrical contact 1112 is electrically coupled to a top layer of the bottom reader stack 1104. The middle reader stack 1103 is disposed on the bottom reader stack 1104, and includes a bottom layer electrically coupled to the first middle electrical contact 1112. A second middle electrical contact 1118 is electrically coupled to a top layer of the middle reader stack 1103. The top reader stack 1102 is disposed on the middle reader stack 1103, and includes a bottom layer electrically coupled to the second middle electrical contact 1118. A top shield 1124, configured as a top electrical contact, is disposed on and electrically coupled to the top reader stack 1124. A region of the read head 1100 facing away from the media-facing surface 1120, generally indicated by reference number 1115, is filled with an isolation material.

In the embodiment of the read head 1100 illustrated in FIGS. 11A-11C, reader stacks 1102-1104 are BSV readers (e.g., TMR or GMR). Reference can be made to FIG. 2C and the description thereof for an example of layers in a multi-BSV reader stack. The described arrangement should not be construed as a requirement and/or as a limitation of the instant disclosure. Alternate arrangements as may be known and/or become apparent to one skilled in the art are considered as being within the metes and bounds of the instant disclosure. It should be apparent to one skilled in the art that any one or more reader stacks can have alternate configurations. For instance, any of the one or more reader stacks described herein can be configured as a TSV reader. It should also be apparent that the illustrated embodiment of the read heads and/or any alternative configurations of a read head can include a combination of one or more BSV and TSV readers arranged or disposed in any order.

In some embodiments, a selected one or more of the reader stacks 1102-1104 may include a relatively longer seed/AF/SAF layer that extends further away from the media-reading surface 1120 that similar layers of the other stacks 1102-1104. For example, the AF layers may have decreasing length from bottom to top.

While the illustrated read heads described herein include two or three reader stacks, such arrangements should not be construed as a requirement and/or as a limitation of the instant disclosure. It will be apparent to one skilled in the art that other embodiments of stacked read heads can include four or more reader stacks.

Figure 12:
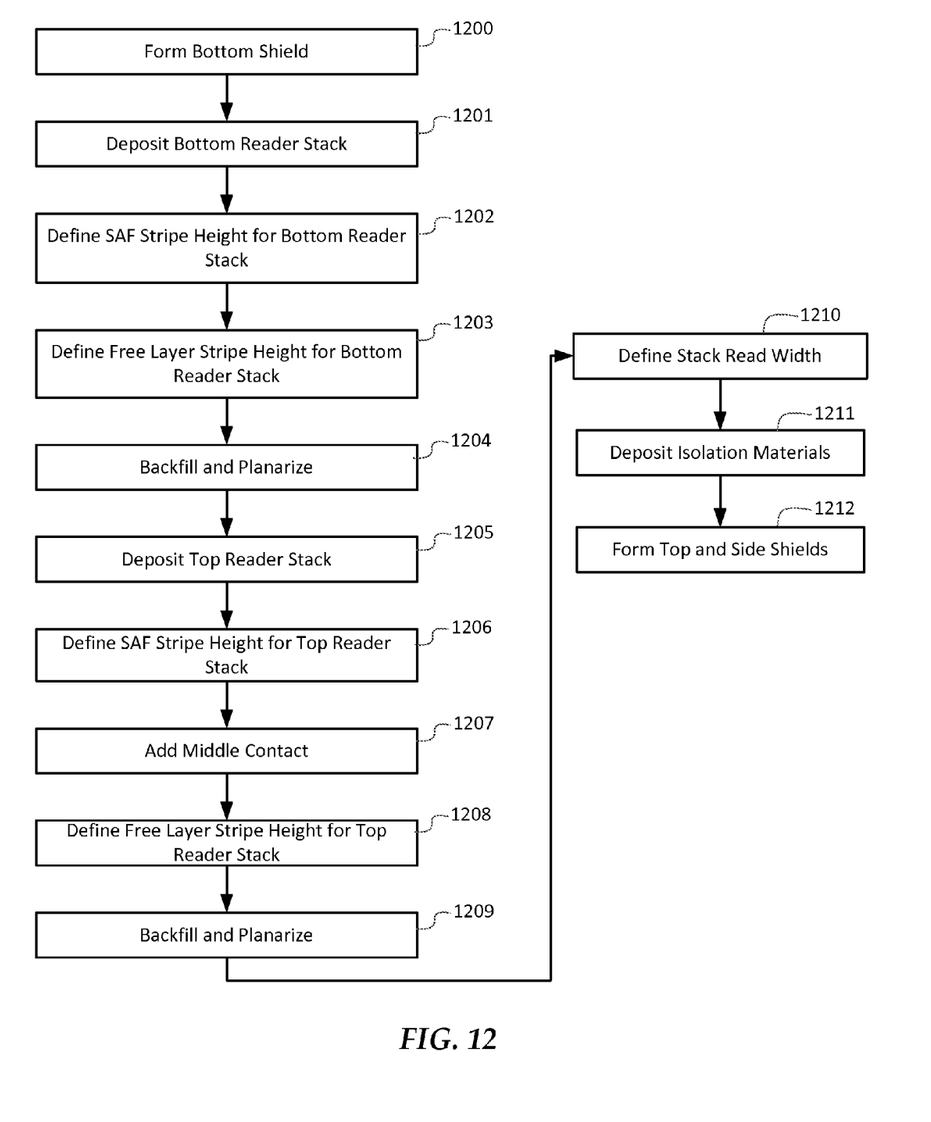
FIG. 12 is a flowchart illustrating a procedure according to an example embodiment.

In reference now to FIG. 12, a flowchart illustrates a procedure for forming a self-aligned stacked reader configuration according to an example embodiment. This process includes successive masking steps used to form a three-contact two-reader structure such as shown in FIGS. 2A-B, although may be adapted appropriately for other embodiments. The process involves forming 1200 a bottom shield (e.g., bottom contact) and depositing 1202 a bottom reader stack on the bottom shield. The stripe height for the SAF layer and free layer are defined 1202, 1203, after which the bottom reader is backfilled and planarized 1204.

The top reader stack is then deposited 1205, and stripe height is defined 1205 for the top reader SAF layer. A middle contact is added 1207 before defining 1208 the stripe height for the free layer. The top reader is backfilled and planarized 1209, after which the read width for the entire stack is defined 1210. Isolation materials are deposited 1211, and then top and side shields are formed 1212. The embodiment of the successive masking process, as outlined herein, will yield a stacked reader configuration having self-aligned readers. In some embodiments, the successive masking process, as outlined herein, may result in a structure having a high aspect ratio (shield-spacing versus reader width), and may utilize processes such as are used to form write poles of a read write head.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A read head, comprising:
    a bottom shield configured as a bottom electrical contact;
    a bottom reader stack disposed on and electrically coupled to the bottom shield and comprising a cap layer;
    a top reader stack disposed on the bottom reader stack with no intervening layers between the cap layer of the bottom reader stack and a seed layer of the top reader stack;
    a middle electrical contact recessed from a media-facing surface of the read head and abutting an edge of the top reader stack that faces away from the media-facing surface, the middle electrical contact electrically coupled to the cap layer of the bottom reader stack; and
    a top shield configured as a top electrical contact, the top shield disposed on and electrically coupled to the top reader stack.

2. The read head of claim 1, wherein:
    the bottom reader stack comprises a bottom seed layer disposed on the bottom shield; and
    the top reader stack comprises a top cap layer, wherein the top shield is disposed on the top cap layer, and wherein a selected one of the seed layer of the top reader stack and the bottom seed layer extend further away from a media-reading surface of the read head than another of the seed layer of the top reader stack and the bottom seed layer.

3. The read head of claim 1, wherein one of the first and second readers comprises a bottom spin valve reader.

4. The read head of claim 3, both of the first and second readers comprise bottom spin valve readers.

5. The read head of claim 3, wherein one of the first and second readers comprises a top spin valve reader.

6. The read head of claim 1, wherein the top and bottom reader stacks are symmetrically aligned about a centerline of the read head.

7. The read head of claim 1, wherein the top and bottom reader stacks are asymmetrically aligned about a centerline of the read head.

8. The read head of claim 1, wherein at least one of the top and bottom reader stack is offset from the other of the top and bottom reader stack.

9. The read head of claim 1, wherein the middle electrical contact is electrically coupled to an edge of the cap layer of the bottom reader stack that faces away from the media-facing surface.

10. The read head of claim 1, wherein the seed layer of the top reader stack extends further away from the media-facing surface than any layers of the bottom stack.

11. The read head of claim 1, wherein the middle electrical contact is formed separately from the top reader stack.

12. A read head, comprising:
    a bottom shield configured as a bottom electrical contact;
    a bottom reader stack disposed on and electrically coupled to the bottom shield;
    at least one middle shield disposed on the bottom reader stack and configured as at least one middle electrical contact;
    a top reader stack disposed on the at least one middle shield; and
    a top shield configured as a top electrical contact, the top shield disposed on and electrically coupled to the top reader stack, at least one of the top and bottom reader stacks are electrically coupled to the at least one middle shield, a selected one of the top and bottom reader stack comprising long seed layers that extend further away from a media-reading surface of the read head than seed layers of the other of the top and bottom reader stack.

13. The read head of claim 12, wherein both the top and bottom reader stacks are electrically coupled to the at least one middle shield.

14. The read head of claim 13, wherein the at least one middle shield comprises a synthetic anti-ferromagnet.

15. The read head of claim 12, wherein the at least one middle shield comprises a lower middle shield electrically coupled to the bottom reader stack and an upper middle shield electrically coupled to the top reader stack, the read head further comprising an electrical isolation layer between the upper and lower middle shields.

16. The read head of claim 15, wherein:
    the at least one middle electrical contact comprises a lower middle electrical contact electrically coupled to the lower middle shield and an upper middle electrical contact electrically coupled to the upper middle shield;
    the electrical isolation layer extends between the upper and lower middle electrical contacts.

17. The read head of claim 12, wherein both of the first and second readers comprises bottom spin valve readers.

18. The read head of claim 17, wherein both of the first and second readers comprises bottom spin valve readers and another of the first and second readers comprises a top spin valve reader.

19. A read head, comprising:
    a bottom shield configured as a bottom electrical contact;
    a bottom reader stack disposed on and electrically coupled to the bottom shield;
    a first middle electrical contact recessed from a media-facing surface of the read head and electrically coupled to a cap layer of the bottom reader stack;
    a middle reader stack, a seed layer of the middle reader stack being disposed on the cap layer of the bottom reader stack with no intervening layers therebetween, the seed layer of the middle reader stack electrically coupled to the first middle electrical contact, an edge of the middle reader stack that faces away from the media-facing surface abutting the first middle electrical contact;
    a second middle electrical contact recessed from the media-facing surface electrically coupled to a cap layer of the middle reader stack and;
    a top reader stack, seed layer of the top reader stack being disposed on the cap layer of the middle reader stack with no intervening layers therebetween, the seed layer of the top reader stack electrically coupled to the second middle electrical contact, an edge of the top reader stack that faces away from the media-facing surface abutting the second middle electrical contact; and
    a top shield configured as a top electrical contact, the top shield disposed on and electrically coupled to a cap layer of the top reader stack.

20. The read head of claim 19, wherein the bottom layer of the middle reader stack and the bottom layer of the top reader stack extend further away from the media-facing surface than any layers of the bottom stack.

* * * * *